Dec. 26, 1967 S. NESTER 3,360,270

RECORD SPINDLE ADAPTOR

Filed Jan. 15, 1965 4 Sheets-Sheet 1

INVENTOR.
Stephen Nester
BY [signature]
Attorney

Dec. 26, 1967 S. NESTER 3,360,270

RECORD SPINDLE ADAPTOR

Filed Jan. 15, 1965 4 Sheets-Sheet 2

INVENTOR.
Stephen Nester
BY
[signature]
Attorney

RECORD SPINDLE ADAPTOR

Filed Jan. 15, 1965

INVENTOR.
Stephen Nester
BY
Attorney

RECORD SPINDLE ADAPTOR

Filed Jan. 15, 1965 4 Sheets-Sheet 4

INVENTOR.
Stephen Nester
BY [signature]
Attorney

United States Patent Office 3,360,270
Patented Dec. 26, 1967

3,360,270
RECORD SPINDLE ADAPTOR
Stephen Nester, Keyport, N.J., assignor to Duotone Company, Inc., Keyport, N.J., a corporation of New York
Filed Jan. 15, 1965, Ser. No. 440,654
2 Claims. (Cl. 274—10)

ABSTRACT OF THE DISCLOSURE

A spindle adaptor, that can be fitted to either straight or offset spindles, having a latching spring for aligning the adaptor with respect to a spindle and a plate which actuates record supporting feet and separator blades. Upon installation a reactance washer is distorted by engagement with the spindle and subsequent release of the adaptor results in the restoring force of the washer causing a lift of the adaptor allowing for clearance between the plate and the spindle shelf.

This invention relates to record changers for phonographs and more specifically to means by which adaptors for fitment upon the spindles of the turntables of the phonographs can be used for the numerous types of spindles in use at the present time.

This application is a continuation-in-part of my copending application Ser. No. 298,838, now abandoned filed July 31, 1963.

At present time there are various types of spindles in use on record players and one of the problems encountered is in the provision of a record adaptor which can be universally used or applied to the various types of spindles. Presently, the purchaser of an adaptor must obtain a specifically-constructed adaptor arranged to fit the particular make of record player which he owns, and it very often requires the securement of the adaptor in a trial and error basis and the return to the dealer several times if necessary until a properly-fitting adaptor is secured. This not only results in inconvenience to the dealer but to the purchaser as well, and it requires the maintenance of a larger stock of the adaptors by the dealer.

It is therefore an object of the present invention to provide an adaptor for use in enabling records of the large center-hole type to be used, and which adaptor will be provided with spindle-engaging means so designed and constructed that the adaptor can, without adjustment or alterations to be fitted on at least a very substantial number of the record players in use at the present time.

With these and other objects to be hereinafter set forth in view, I have devised the arrangement of parts to be described and more particularly pointed out in the claims appended hereto.

In the accompanying drawings, wherein as illustrative embodiment of the invention is disclosed, FIG. 1 is a view, partly in section, of an adaptor constructed according to the invention;

Figure 1:
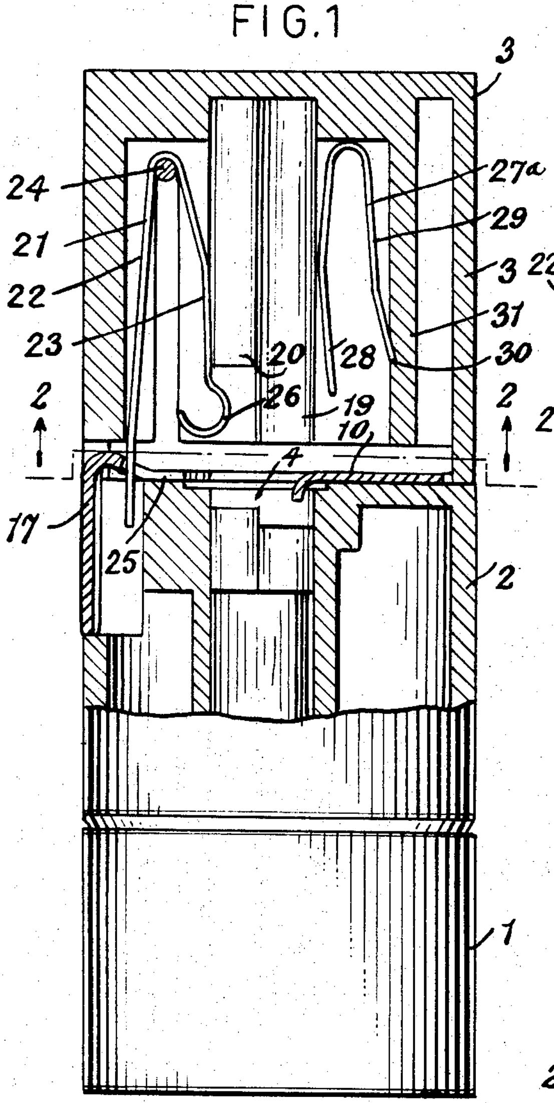
Figure 2:
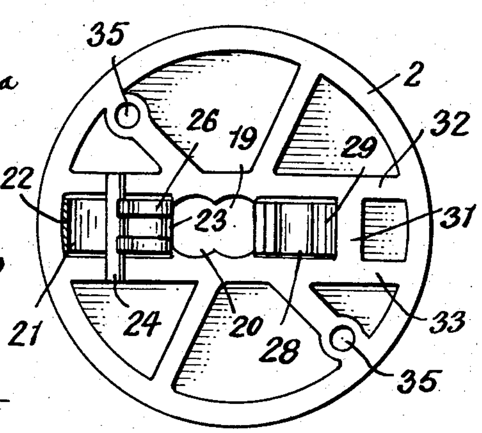
FIG. 2 is a view, taken substantially on the line 2—2 of FIG. 1, looking in the direction of the arrows the centering plate 10 being omitted.
Figures 3, 4, 5:
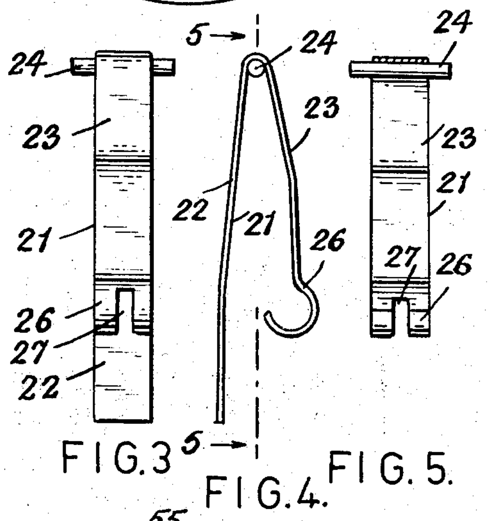
FIG. 3 is a face view of one of the spindle-engaging springs.
FIG. 4 is an edge view of the spring shown in FIG. 3.
FIG. 5 is a sectional view, taken substantially on the line 5—5 of FIG. 4, looking in the direction of the arrows.
Figure 7:
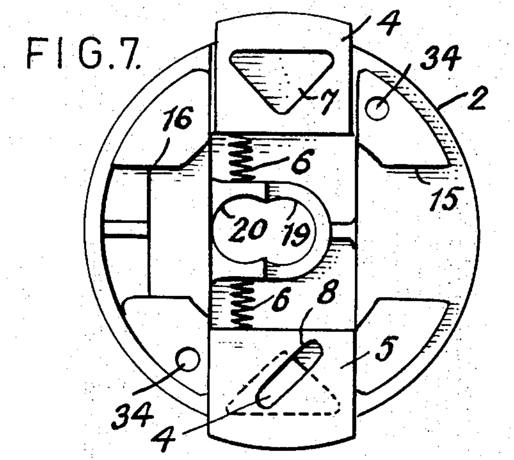
FIG. 7 is a top plan view of the center section of the adaptor.

The adaptor as shown in FIGS. 1 to 13 of the drawings includes a tubular lower section 1, an intermediate section 2 disposed on top of the lower section, and a top section 3. Most of the known types of adaptors of this kind are similarly constructed.

Mounted on top of the central or intermediate section 2 are the slidable detents 4, 4 (FIG. 7) over which are arranged the slidable blades 5, 5. The detents 4, 4 are spring-biased by the springs 6, and said detents have triangular apertures 7, while the blades have angular slots 8 extending across said apertures. The arrangement of these detents and blades and several other elements of the record-releasing means are known and are therefore not described in detail since they form no part of the present invention.

A centering plate is shown at 10, the same being of cruciform shape and it rests over the detents 4 and over the blades 5 and is slidable across the same. The plate 10 has arms 11, 12, 13 and 14, the arms 12 and 14 being guided respectively in the grooves 15 and 16 in the top of the intermediate section 2 of the adaptor. Arm 14 is provided with a downwardly-bent finger-piece 17 accessible in the slot 18 in the wall of the section 2 and part of which is in the wall of the upper section 3 as clearly shown in FIG. 11. Pins 39 are provided on the under side of the plate 10, said pins entering into the slots 9 and the apertures 7.

Figure 12:
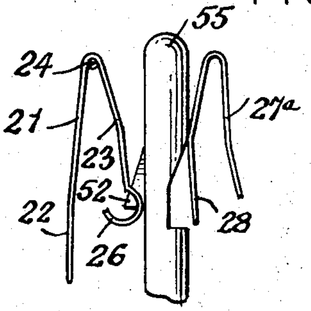
FIG. 12 and 13 are diagrammatic view showing how different kinds of spindles are engaged by the springs.
Figure 6:
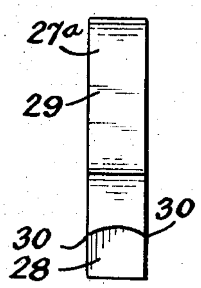
FIG. 6 is a face view of the second spindle-engaging spring.
Figure 8:
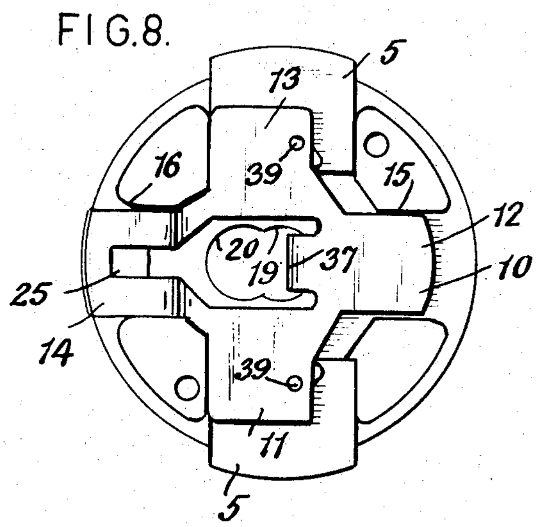
FIG. 8 is a view somewhat similar to FIG. 7, but showing the centering device in position.
Figure 9:
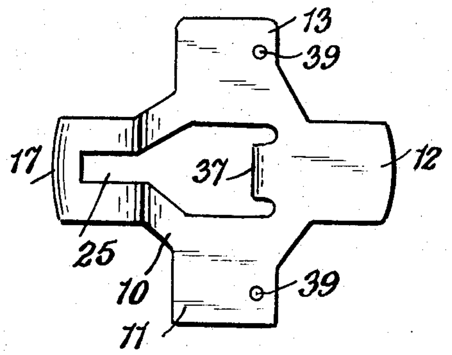
FIG. 9 is a top plan view of the centering device.
Figure 10:
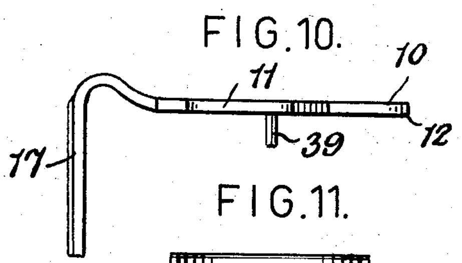
FIG. 10 is an edge view of the centering device.
Figure 13:
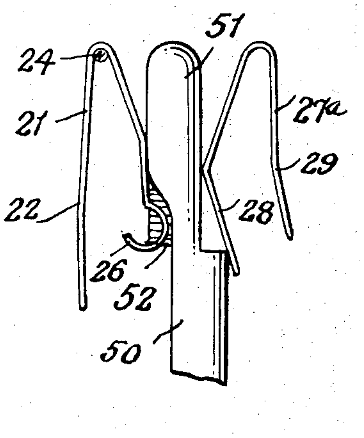

Provided in the upper cup-shaped section 1 is a spindle-receiving passage of double or dual formation as indicated at 19 and 20 for the accommodation of both a straight spindle 55 of FIG. 12 and off-set spindles as shown at 51 in FIG. 13. Located at one side of this passage is an inverted U-shaped leaf spring 21 having its longer leg 22 projecting into the adaptor section 2 and entering a slot 25 provided in the centering plate 10. The spring 21 is mounted in place within the cup-shaped adaptor section 3 by having its bight or loop portion extending over a cross pin 24 fixed on the inside of the section 3. The second leg 23 of the spring 21 has its lower end terminating in a loop or hook 26 which is longitudinally slotted as shown at 27 to thereby provide a looped, bifurcated extremity on this leg of the spring.

The opposite side of the spindle passage 19, 20 is provided with a second inverted U-shaped spring 27*a*, the leg 28 thereof being springably urged toward the spindle passages 19, 20 and the second leg shown at 29 terminating in pointed extremities 30 which bite into a wall 31 provided in the interior of the cup 3 to thereby hold the spring 27 against displacement. The springs 21 and 27*a* are mounted in the cup 3 between the partitions 32 and 33 provided in the interior of the cup 3.

The manner in which different types of record spindles are engaged by the springs 21 and 27*a* is shown diagrammatically in FIGS. 12 and 13. In FIG. 12 is shown a straight spindle 55 having a movable lug 52 which lug, or one more or less similar to it, is common to most spindles as presently used. When spindle 55 is inserted in the passage 19 it will be engaged between the two springs 21 and 27*a* substantially as shown in FIG. 12, with the lug 52 entering the slot 27 in the bifurcated hook portion 26 of the spring 21 and the leg 28 engaging the spindle at a substantially diametrically opposite point.

Spindles of the kind used on record players are usually divided into two groups, one of which is the straight type shown in FIG. 12 and the other being the offset type, an example of which is shown at 51 in FIG. 13. It will be therein seen that this type is also provided with a movable lug 52 which is taken over or straddled by the bifurcated hook 26 as disclosed in respect to the straight spindle of FIG. 12. The two-passage arrangement 19, 20 in the upper section 3 arranges for the accommodation of this offset type of spindle. The two types of spindles shown are exemplary of many other types which can be accommodated by the adaptor.

In FIG. 1 of the drawing, the springs 21 and 27*a* are shown, for clarity in illustration, in a more or less stressed position or as they might appear when a spindle is in place in the adaptor. Actually, when a spindle is not in place the springs will be distended or have their legs spread wider apart then is shown in FIG. 1 so that when the spindle is inserted between the springs, the spindle will be firmly gripped by them and substantially as shown in FIGS. 12 and 13.

Figure 11:
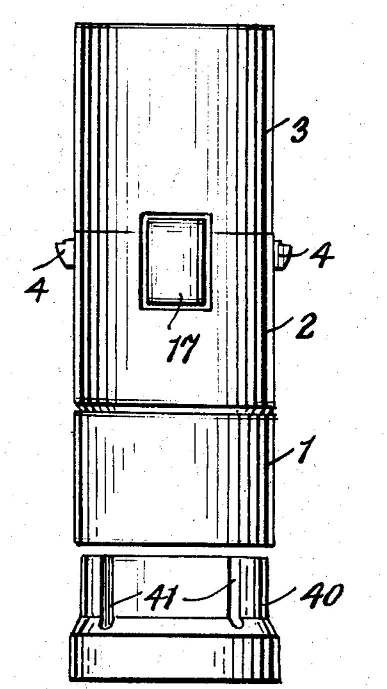
FIG. 11 is an elevational view of the adaptor, also showing an insert which can be used when an extension of the length of the adaptor is found necessary for some types of spindles.

In some cases, it is found desirable to increase the overall height of the adaptor and when this is necessary an extension plug or sleeve 40, shown in FIG. 11, may be used. Such a plug or sleeve is in the form of a tubular member which can be tightly frictionally fitted within the lower end of the section 1, the plug having its side wall split at intervals, as shown at 41, to provide for resiliency and to insure a snug fit of the plug in the end of the adaptor section 1.

Figures 14, 15, 16, 17, 18:
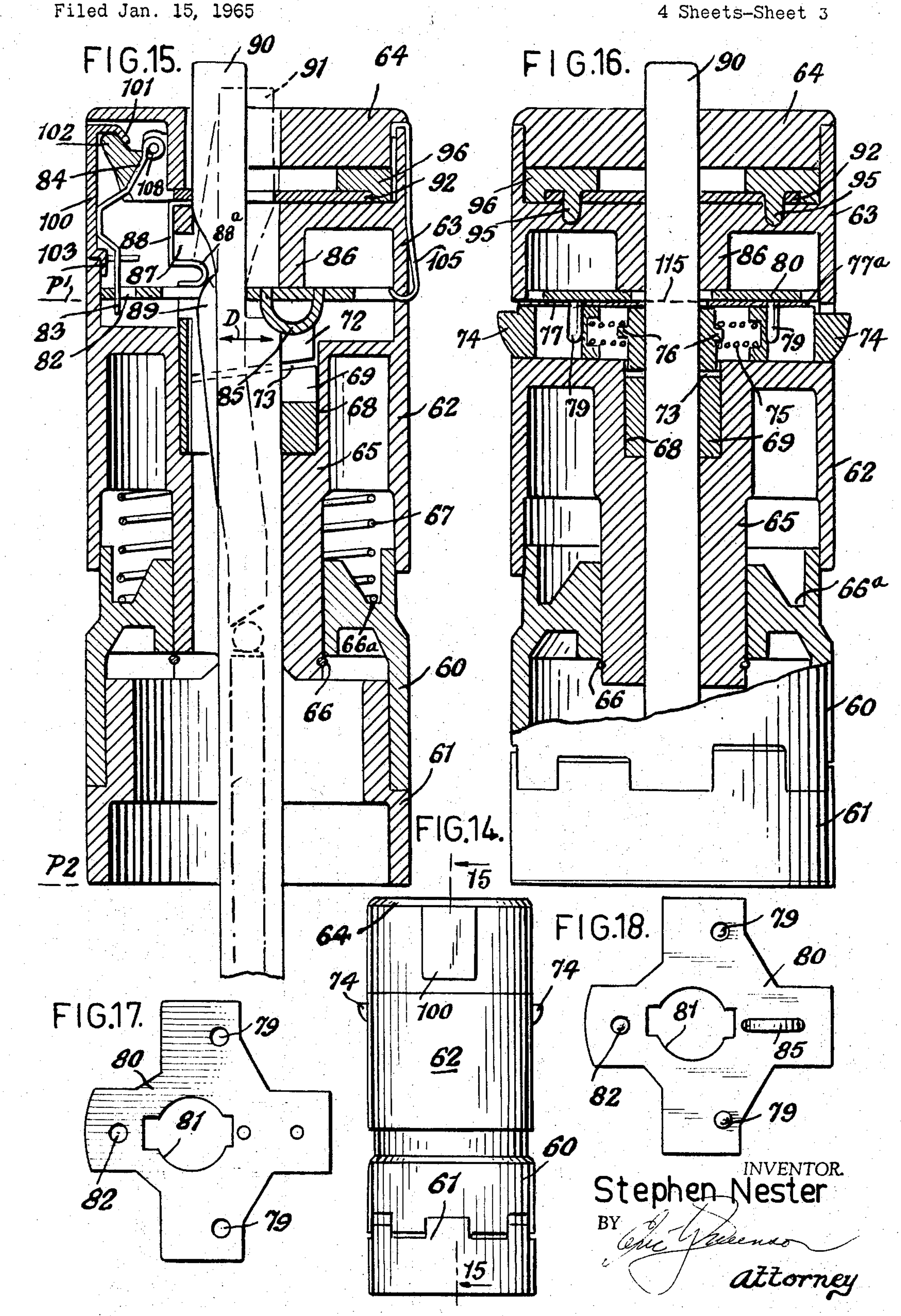
FIG. 14 is an elevational view of another embodiment of the invention.
FIG. 15 is a vertical sectional view, taken substantially on the line 15—15 of FIG. 14, looking in the direction of the arrows.
FIG. 16 is a vertical sectional view, taken at right angles to that of FIG. 15.
FIG. 17 is a top face view of the centering plate employed in this embodiment of the invention.
FIG. 18 is a view of the under side of the centering plate.
Figure 19:
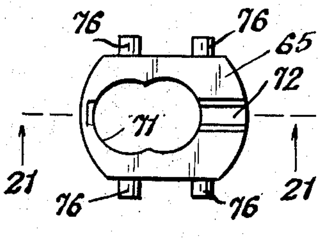
FIG. 19 is a top plan view of the insert guide.
Figure 20:
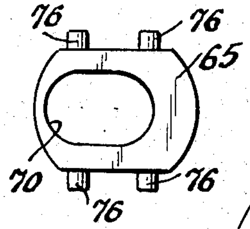
FIG. 20 is a view of the insert guide as seen from below.
Figure 23:
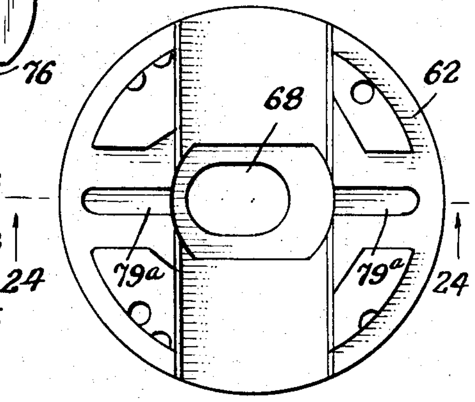
FIG. 23 is a top plan view of the central or intermediate section of the body of the adaptor.
Figure 21:
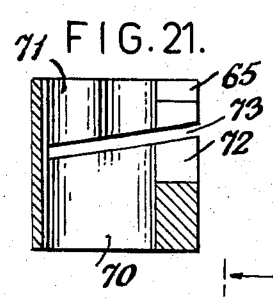
FIG. 21 is a sectional view, taken substantially on the line 21—21 of FIG. 19, looking in the direction of the arrows.
Figure 22:
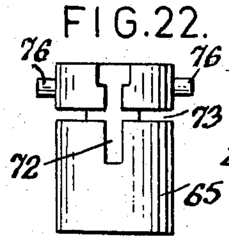
FIG. 22 is a view of the insert guide as seen from the right of FIG. 21.
Figure 25:
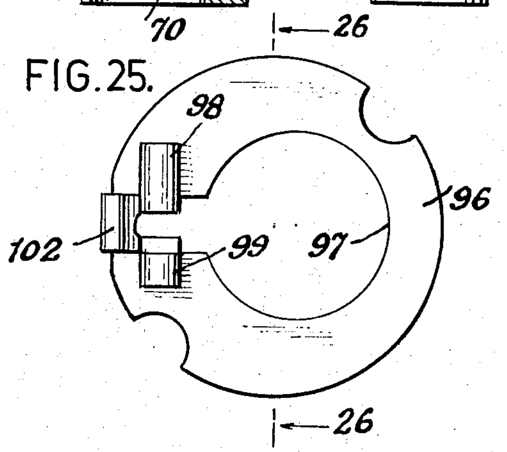
FIG. 25 is a top plan view of the retainer.
Figure 24:
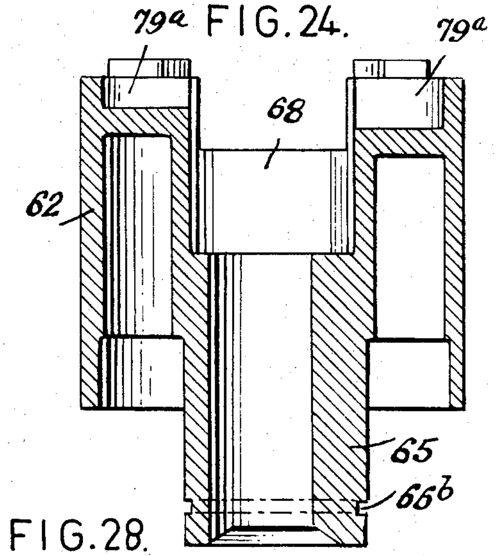
FIG. 24 is a vertical sectional view, taken substantially on the line 24—24 of FIG. 23, looking in the direction of the arrows.
Figure 26:
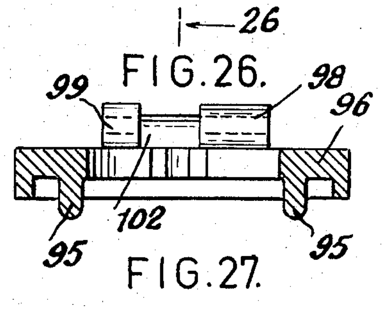
FIG. 26 is a sectional view, taken substantially on the line 26—26 of FIG. 25, looking in the direction of the arrows.
Figure 27:
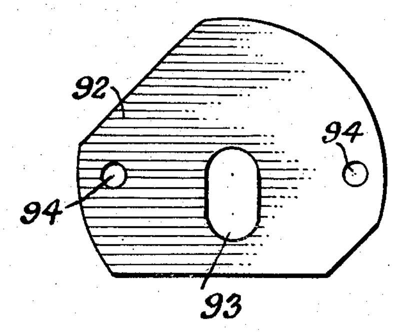
FIG. 27 is a face view of the reactance washer.

In the embodiment shown in FIGS. 15 to 28, the body of the adaptor includes a tubular lower section 60 including a skirt 61, a middle or intermediate section 62, a top section 63 and a cap 64, the parts being arranged in the assembled condition disclosed in FIGS. 14, 15 and 16. The middle section 62 includes a central boss or hub 65 provided with a retaining ring 66 received in a groove 66*b* (FIG. 24) maintaining the part 62 from separation from the lower section 60. Said lower section is provided with a seat 66*a* receiving a coil spring 67 biasing the middle section upwardly. Said spring has been omitted from FIG. 16.

The upper portion of the boss or hub 65 is formed with a depression 68 containing an insert guide 69, the shape of which is disclosed in FIGS. 19 to 22. Said insert guide is in the form of a sleeve provided with an axial passage through it, the lower part of the passage being of ovate form as indicated at 70. The upper portion of the passage is of double or dual formation as shown at 71. The wall of the insert guide is formed with a vertical slot 72 extending downwardly for a part of the height of the guide and the wall is also formed with an angular or inclined transverse slot 73.

Mounted at the top of the intermediate section 62 of the body of the adaptor are the detents 74 normally spring-biased by coil springs 75, maintained at one end by pins 76 provided on the insert guide 65.

Figure 28:
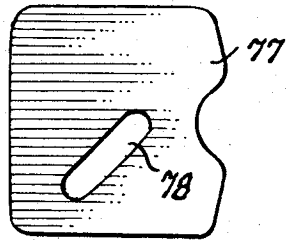
FIG. 28 is a face view of one of the record-supporting plates or blades.

Located above the detents 74 are the two blades 77 and 77*a* shown in FIGS. 16 and 28 but omitted from FIG. 15. Each of these blades is provided with an angular slot 78 engaged by the downwardly projecting pins 79 provided on the cruciform plate 80 located over the blades 77 and 77*a*. Said pins 79 are guided in grooves 79*a* formed in the top of the body section 62. The plate 80 is formed with an opening 81 and a smaller hole 82, the latter hole receiving the downwardly projecting leg 83 of a wire spring 84. Projecting downwardly from the bottom of the plate 80 is a loop 85 constituting a locating device.

The upper section 63 of the body of the adaptor includes a central boss 86 disposed above the plate 80, the boss being notched as shown at 87 to permit the entry of a latching leaf spring 88 having a bifurcated end for engagement with the spindle actuator 89. A spindle of the off-set type is shown at 90, while a spindle of the straight type is shown at 91. A reactance washer is shown at 92, the same having a central opening 93 and lateral holes 94 through which pass pins 95 provided on the bottom of a retaining member 96 shown in detail in FIGS. 25 and 26. Said retaining member is provided with a relatively large opening 97 and with bosses 98, 99 in which the spring 84 is mounted and is caused to exert spring bias against a thumb pad shown at 100. The thumb pad is provided at its upper end with a lip 101 which engages against an abutment 102 provided on the retaining member 96. A lower lug 103 is provided on the thumb pad for co-operation with lip 101 in limiting the outward movement of the thumb pad under the pressure of the spring 84.

A cap for the upper end of the adaptor body is shown at 64, the same having a central opening 104. At 105 is shown a friction spring.

The so-called "support-shelf" 115 found on center spindles is used as a common plane for all vertical locating when a large hole spindle adaptor such as that shown herein, is installed. The bottom of the cruciform plate 80 strikes the support shelf 115 causing accurate location. During the installation, the upper portion of the spindle contacts with the reactance washer 92 and distorts it upwardly, said washer being flexible to permit of this distortion, so that when the spindle adaptor is released, the spindle adaptor raises slightly as the reactance washer tends to return to its previous undistorted shape. This slight vertical lift causes a predetermined clearance between the under face of the plate 80 and the support shelf 115, allowing the plate 80 to freely actuate. The remaining amount of distortion of the reactance washer 92 causes the exertion of pressure on the spindle and helps to prevent any vertical movement of the large spindle adaptor during its operation. The latching spring 88 has a bifurcated end 88*a* which straddles the spindle pawl 89, while the U-shaped loop 85 engages in the common slot found in all center spindles, aligning the record changer and preventing rotation during its operation.

The thumb pad 100 is not an integral part of the cruciform plate 80, but is independently movable of it. As said thumb plate is depressed inwardly, it traverses the spring 83 for a distance determined by the diameter of the hole 82, before striking the plate 80 and moving it far enough to allow a straight, flat-top spindle shown at 91 to strike the U-shaped locating loop 85 at a point where a downward pressure exerted on the record changer automatically moves the cruciform plate 80 to an extent to allow the spindle to pass through the device and into the top section 62 thereof. As the upper part passes the line indicated at P′ the cruciform plate 80 returns to an extent sufficient to allow vertical locating of the spindle as above explained. This vertical locating of the spindle will take place even if the thumb pad 100 is depressed during the entire installation procedure.

The variable distance between the lines P′ and P2 is automatically compensated for by the spring-loaded vertical movement of the part 60 under the force of the spring 66.

The upper section of the insert guide 65, or that part of the guide which is located above the slot 73, is sprung inwardly to allow pressure to be exerted on all spindles at their most consistent diameter indicated at D. This friction, in conjunction with the upward thrust of the spring 66 and the friction of the reactance washer 42, maintains vertical stability. The angular slot 73 allows for a gradual lead-in of the spindles and prevents possible binding. The back pressure exerted on the spindle actuator is critical on most record changers so that the thumb spring 84 is designed with reverse coils to maintain constant pressure through the entire traversing movement of the plate 80.

The friction springs, one of which is shown at 105 are designed to offset the varying downward pressures exerted on a stack of records by the record supports. This prevents jamming of the record changer due to too much downward pressure exerted by the weight of the stack of records and the record-supporting arm.

Having thus described embodiments of the invention, it is obvious that the same is not to be restricted thereto, but is broad enough to cover all structures coming within the scope of the annexed claims.

What I claim is:

1. In a record adaptor for use with a spindle having a slot, a shelf and an actuating cam, a body having a spindle passage, a sleeve situated in the body and adapted to receive a spindle of either an offset or straight type, record-supporting feet arranged around the sleeve and spring-biased by spring means disposed between them and the sleeve, blades arranged above the feet and slidably mounted relatively thereto, a plate of cruciform shape mounted above the blades and slidable transversely of the body and having a passage through which the spindle extends, said plate having parts for engaging said blades, a thumb pad movable toward the spindle, a first spring engaging the plate and the thumb pad and operative to bias the thumb pad in one direction, the plate having an element for engaging with said slot, a fixed latching spring having a part adapted to straddle the cam, and a flexible reactance washer, which upon distortion tends to return to its original shape, arranged above the latching spring, said washer having a spindle receiving passage disposed in alignment with the spindle passage in said body and having a portion bounding the passage overlying the spindle passage in said body, said washer being distortable upwardly by engagement of said portion with said spindle when the adaptor is placed in the spindle and upon release of the adaptor placing force returning to its original position, thereby providing a lifting force which causes a predetermined amount of clearance between the plate and the shelf to allow for sliding movement of the plate.

2. A spindle adaptor for use with a spindle having a shelf comprising, an adaptor body having lower, intermediate and upper body sections arranged in superposed relation and having a common spindle-receiving opening through them, spring means biasing the lower section in a direction away from the intermediate section, a split sleeve disposed axially in the intermediate section around a spindle, said sleeve having an ovate spindle-receiving passage extending through it, record-supporting feet arranged around the sleeve and spring-biased by spring means disposed between them and the sleeve, blades arranged above the feet and slidably mounted relatively thereto, a cruciform plate slidably mounted above the blades and movable transversely of the adaptor, said plate having parts engaging with the blades, said plate having a downwardly-extending part disposed in the split of the sleeve, the cruciform plate having an opening through which the spindle passes, a spring-biased thumb pad movable in the upper section and biased outwardly by a second spring means, said second spring means engaging the cruciform plate, said thumb pad being operative against the bias of the second spring means to shift said second spring means and said cruciform plate, a latching spring for engaging the spindle to hold the adaptor against rotation relatively to the spindle, and a flexible reactance washer, which upon distortion tends to return to its original shape, arranged above the latching spring, said washer having a spindle receiving passage disposed in alignment with said common spindle receiving opening and having a portion bounding the passage overlying said common spindle receiving opening, said washer being distortable upwardly by engagement of said portion with said spindle when the adaptor is placed on the spindle and upon release of the adaptor placing force returning to its original position, thereby providing a lifting force which causes a predetermined amount of clearance between the cruciform plate and the shelf to allow for the sliding movement of the plate.

References Cited

UNITED STATES PATENTS

| | | | |
|---|---|---|---|
| 2,761,687 | 9/1956 | DaCosta | 274—10 |
| 2,858,134 | 10/1958 | Mavis | 274—10 |
| 2,884,255 | 4/1959 | Wennerbo et al. | 274—10 |
| 2,918,288 | 12/1959 | Van Antwerp | 274—10 |
| 3,015,490 | 10/1962 | Hoffman | 274—10 |
| 3,191,943 | 6/1965 | Reed | 274—10 |

FOREIGN PATENTS

| | | |
|---|---|---|
| 883,076 | 11/1961 | Great Britain. |

ROBERT B. HULL, *Primary Examiner.*

LEONARD FORMAN, *Examiner.*

J. M. FREED, *Assistant Examiner.*